United States Patent
Tonami et al.

(10) Patent No.: US 9,638,808 B2
(45) Date of Patent: May 2, 2017

(54) RADIATION DETECTOR

(71) Applicant: Shimadzu Corporation, Kyoto (JP)

(72) Inventors: Hiromichi Tonami, Kyoto (JP); Tomoaki Tsuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/026,772

(22) PCT Filed: Sep. 26, 2014

(86) PCT No.: PCT/JP2014/075739
§ 371 (c)(1),
(2) Date: Apr. 1, 2016

(87) PCT Pub. No.: WO2015/050066
PCT Pub. Date: Apr. 9, 2015

(65) Prior Publication Data
US 2016/0252628 A1    Sep. 1, 2016

(30) Foreign Application Priority Data
Oct. 3, 2013  (JP) .................................. 2013-208170

(51) Int. Cl.
*G01T 1/20* (2006.01)
*G01T 1/16* (2006.01)
(Continued)

(52) U.S. Cl.
CPC ............ *G01T 1/202* (2013.01); *G01T 1/1644* (2013.01); *G01T 1/2002* (2013.01); *G01T 1/2018* (2013.01)

(58) Field of Classification Search
CPC ... G01T 1/1644; G01T 1/2002; G01T 1/2018; G01T 1/202
See application file for complete search history.

(56) References Cited

U.S. PATENT DOCUMENTS

2004/0178347 A1  9/2004  Murayama et al.
2010/0320389 A1  12/2010 Tonami et al.
(Continued)

FOREIGN PATENT DOCUMENTS

| EP | 2244106 A1 | 10/2010 |
| JP | 2004279057 A | 10/2004 |
| WO | 2009101730 A1 | 8/2009 |

OTHER PUBLICATIONS

International Search Report dated Dec. 2, 2014 from corresponding International Application No. PCT/JP2014/075739; 8 pgs.
(Continued)

*Primary Examiner* — Mark R Gaworecki
(74) *Attorney, Agent, or Firm* — Maier & Maier, PLLC

(57) ABSTRACT

A radiation detector that allows accurate discrimination of generating positions of fluorescence in a height direction generated in scintillation counter crystals. Specifically, the radiation detector includes scintillation counter crystals whose faces are rough surfaces. This allows suppression of unexpected partial reflection of fluorescence between adjacent scintillation counter crystals, leading to ideal spread of the fluorescence generated in a scintillator. Consequently, a radiation detector that allows accurate discrimination of the generating positions of fluorescence is provided.

11 Claims, 11 Drawing Sheets

(51) Int. Cl.
  *G01T 1/202* (2006.01)
  *G01T 1/164* (2006.01)

(56) References Cited

U.S. PATENT DOCUMENTS

| 2013/0077848 A1* | 3/2013 | Yamada | G01T 1/1644 |
| | | | 382/131 |
| 2013/0306876 A1* | 11/2013 | Uchida | G01T 1/1644 |
| | | | 250/366 |
| 2014/0231655 A1* | 8/2014 | Dueppenbecker | G01T 1/2985 |
| | | | 250/366 |

OTHER PUBLICATIONS

Extended European Search Report dated Aug. 25, 2016 from corresponding Application No. EP14851237.9; 8 pgs.

Yongfeng Yang et al: "Investigation of Depth of Interaction Encoding for a Pixelated LSO Array With a Single Multi-Channel PMT" IEEE Transactions on Nuclear Science, IEEE Service Center, New York, NY, US, vol. 56, No. 5, Oct. 1, 2009, pp. 2594-2599; 6 pgs.

* cited by examiner

Fig.9
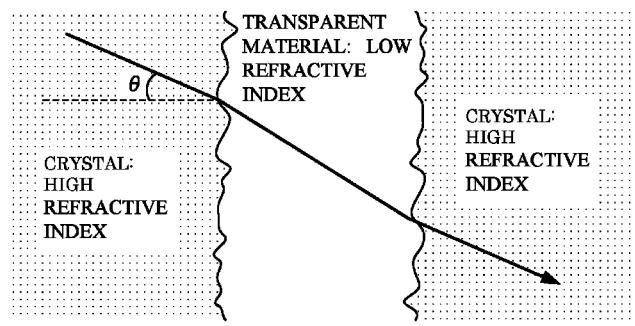
Fig.10
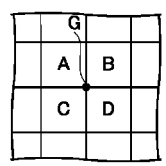
Fig.11
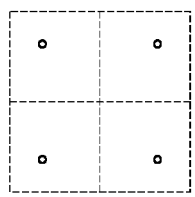
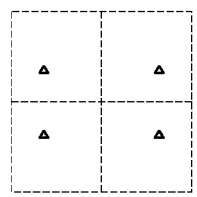
FLUORESCENCE DERIVED FROM L1    FLUORESCENCE DERIVED FROM L2
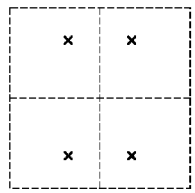
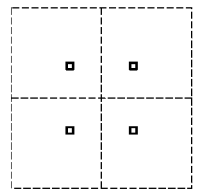
FLUORESCENCE DERIVED FROM L3    FLUORESCENCE DERIVED FROM L4

Fig.12
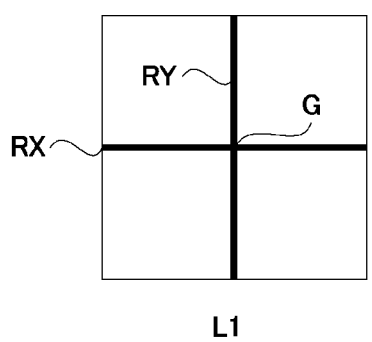
L1
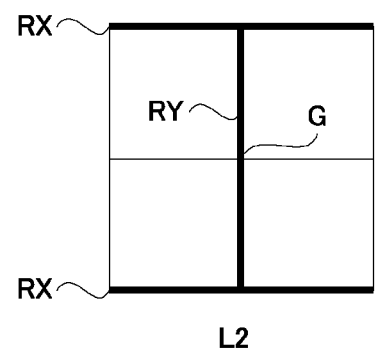
L2
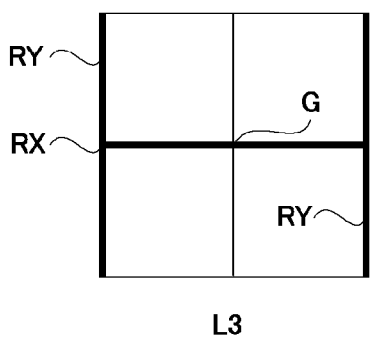
L3
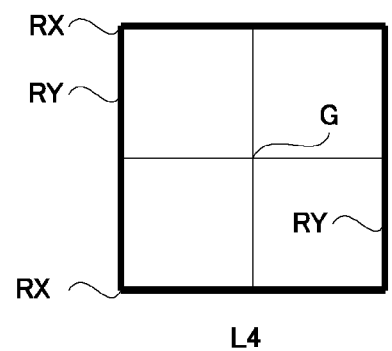
L4

Fig.13
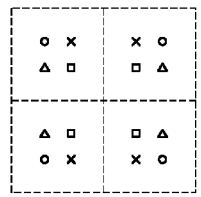
Fig.14
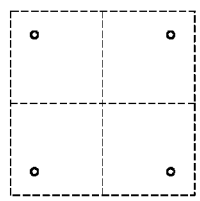 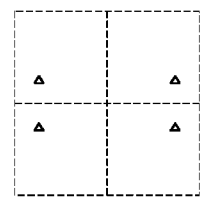
FLUORESCENCE DERIVED FROM L1    FLUORESCENCE DERIVED FROM L2
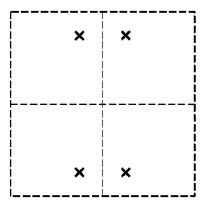 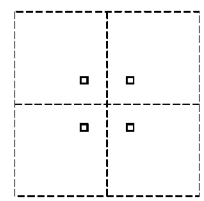
FLUORESCENCE DERIVED FROM L3    FLUORESCENCE DERIVED FROM L4
Fig.15
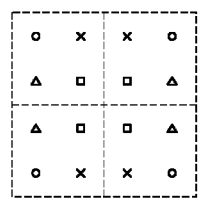 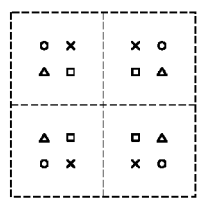

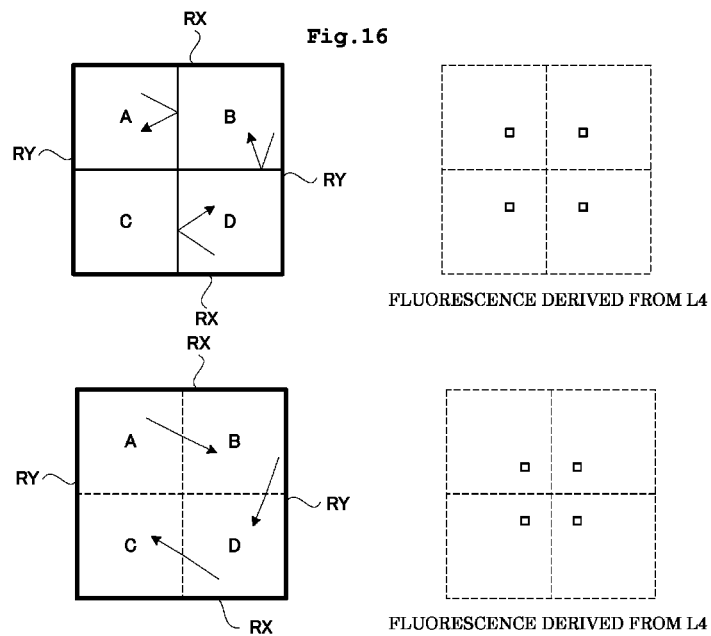
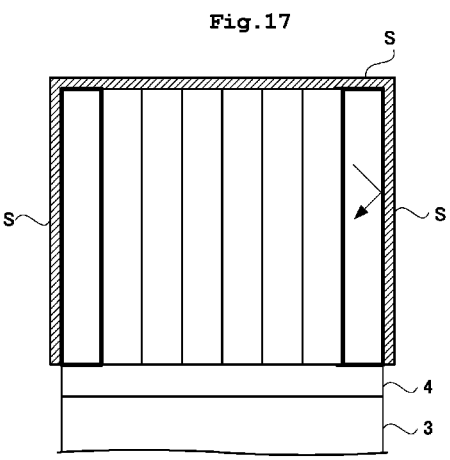

RADIATION DETECTOR

RELATED APPLICATIONS

This application is the U.S. National Phase under 35 U.S.C. §371,of International Application No. PCT/JP2014/075739, filed on Sep. 26, 2014, which in turn claims the benefit of Japanese application No. 2013-208170, filed on Oct. 3, 2013 the disclosures of which applications are incorporated by reference herein.

TECHNICAL FIELD

The present invention relates to a radiation detector having scintillation counter crystals arranged two-dimensionally or three-dimensionally. More particularly, the present invention is directed to a radiation detector having reflectors used for discriminating positions in a depth direction where fluorescence is generated.

BACKGROUND ART

Examples of a radiation detector that detects radiation such as γ-rays include one whose appearance is illustrated in FIG. 20. Such a radiation detector 51 includes a scintillator 52 having scintillation counter crystals c being arranged three-dimensionally in vertical, horizontal, and height directions, and a light detector 53 that detects fluorescence emitted from the scintillator 52. The fluorescence generated from the scintillator 52 is obtained by converting radiation (see, for example, Patent Literature 1).

The radiation detector 51 has a function of discriminating a part of the scintillator 52 in which fluorescence is emitted when determining the fluorescence. Such a function is called a fluorescence position discriminating function. The radiation detector 51 discriminates a position of fluorescence by identifying which of the scintillation counter crystals c constituting the scintillator 52 emits fluorescence.

Accordingly, the scintillator 52 having the simply arranged scintillation counter crystals c allows no accurate position discrimination of the fluorescence. Specifically, discriminating which of the crystals arranged in a height direction with hatch patterns in FIG. 20 emits fluorescence requires reflectors 54 each provided in a gap between adjacent crystals constituting the scintillator 52 for reflecting fluorescence.

The following describes a configuration of the reflectors 54. The reflectors 54 each have the same height as the crystal, and include two types that extend horizontally and vertically, respectively. The reflector 54 extending horizontally engages the reflector 54 extending vertically, whereby a reflector frame is formed having the reflectors 54 in a grid manner. The crystals are arranged so as to be fitted into the reflector frame.

Another scintillator 52 with a new configuration has been currently developed. Specifically, as illustrated in FIG. 21, the scintillator 52 has been developed in which the scintillation counter crystal c of FIG. 20 are integrated in the height direction. Such a scintillator 52 achieves enhanced sensitivity of the radiation detector 51. That is, the scintillator 52 of FIG. 21 positively allows the fluorescence to reach the light detector 53, which configuration differs from that in FIG. 20 with four scintillation counter crystal layers (see, for example, Patent Literature 2).

The scintillator 52 having the configuration illustrated in FIG. 21 also includes four reflector frames constituted by the reflectors 54. The reflector frames allow the radiation detector 51 to discriminate generating positions of the fluorescence in the height direction.

Patent Literature 1: Japanese Patent Publication No. 2004-279057A

Patent Literature 2: International Publication No. WO2009/101730A

SUMMARY OF INVENTION

Technical Problem

However, the currently-used radiation detector possesses the following drawback. That is, the currently-used radiation detector allows no accurate discrimination of the generating positions of the fluorescence in the height direction.

The currently-used radiation detector adopts the feature that layers have different optical environments for discriminating which of the layers of the scintillation counter crystal the fluorescence is generated. That is, the reflectors 54 do not cover all of four side faces of the scintillation counter crystals. For instance, as illustrated in FIG. 22, a first layer of a scintillation counter crystal includes the reflectors 54 on an upper side face and a left side face of the four side faces of the scintillation counter crystal.

Fluorescence generated from a generation point in the first layer of the scintillation counter crystal as mentioned above disperses radially from the generation point as the center, but actually the fluorescence is blocked by the reflectors 54 and spreads rightward and downward so as to be away from the reflectors 54. On the other hand, as illustrated in FIG. 22, a second layer of a scintillation counter crystal includes the reflectors 54 on a lower side face and a left side face of the four side faces of the scintillation counter crystal. Fluorescence generated from a generation point in the second layer of the scintillation counter crystal as above mentioned disperses radially from the generation point as the center, but actually the fluorescence is blocked by the reflectors 54 and spreads rightward and upward so as to be away from the reflectors.

In this manner, the fluorescence generated in the first layer spreads rightward and downward, and the fluorescence generated in the second layer spreads rightward and upward. In other words, fluorescence spreads in different directions depending on the generating point of the fluorescence in the scintillation counter crystal. The currently-used radiation detector discriminates which of layers of the scintillation counter crystal the fluorescence is generated in accordance with this principle.

Such discrimination of the generating position of fluorescence in the height direction is predicated on the feature that fluorescence ideally disperses. Regarding this, the dispersed fluorescence generated in the scintillation counter crystal is positively reflected when entering into the reflectors 54.

However, the scintillation counter crystal includes side faces on which no reflector 54 is provided. Non-ideal phenomenon occurs on the side faces. Specifically, when fluorescence generated in a scintillation counter crystal disperses to a next crystal through the side faces on which no reflector 54 is provided, the dispersed fluorescence partially reflects on the side faces of the crystal. Such refection of fluorescence is schematically illustrated in FIG. 23. The reflection of the dispersed fluorescence is not assumed upon discrimination of the fluorescence in the height direction. Accordingly, this may disturb spread of the fluorescence as illustrated in FIG. 22. That is, reflection of the fluorescence between the adjacent crystals affects the fluorescence position discrimination especially in the height direction. In other words, this leads to position discrimination of the fluorescence with low accuracy.

The present invention has been made regarding the state of the art noted above, and its one object is to provide a radiation detector that allows accurate discrimination of generating positions of fluorescence generated in a scintillation counter crystal in a height direction.

Solution to Problem

The present invention adopts the following construction for overcoming the above drawback. One aspect of the present invention provides a radiation detector. The radiation detector includes a scintillator having scintillation counter crystals for converting radiation into fluorescence being arranged in a matrix, and having a first layer, a second layer, a third layer, and a fourth layer in a height direction; and a light detector optically connected to the scintillator. The scintillator includes a plurality of reflectors that reflects fluorescence, the reflectors including two types, a first type of the reflectors extending horizontally and a second type of the reflectors extending vertically. The first type of the reflectors in the first layer and the second layer are arranged vertically at intervals by one scintillation counter crystal so as to appear alternately in the first layer and the second layer, the first type of the reflectors in the second layer and the third layer are arranged vertically at intervals by one scintillation counter crystal so as to appear alternately in the second layer and the third layer, and the first type of the reflectors in the third layer and the fourth layer are arranged vertically at intervals by one scintillation counter crystal so as to appear alternately in the third layer and the fourth layer. The second type of the reflectors in the first layer and the second layer are arranged horizontally at intervals by two scintillation counter crystals so as to appear at an equal position in the first layer and the second layer, the second type of the reflectors in the second layer and the third layer are arranged horizontally at intervals by one scintillation counter crystal so as to appear alternately in the second layer and the third layer, and the second type of the reflectors in the third layer and the fourth layer are arranged horizontally at intervals by two scintillation counter crystals so as to appear at an equal position in the third layer and the fourth layer. The scintillation counter crystals each have side faces opposite to next scintillation counter crystals, and the side faces are each a rough ground glass surface rougher than a ground smooth surface.

[Operation and Effect]The radiation detector of one aspect of the present invention includes the scintillation counter crystals whose faces are rough surfaces. This allows suppression of unexpected partial reflection of fluorescence between adjacent scintillation counter crystals, leading to ideal spread of the fluorescence generated in the scintillator. Consequently, the present invention provides the radiation detector that allows accurate discrimination of the generating positions of fluorescence.

Moreover, it is more preferred in the radiation detector of the present invention that the adjacent scintillation counter crystals constituting the scintillator are optically coupled via a transparent material whose refractive index is lower than that of a material of which the scintillation counter crystals are composed.

[Operation and Effect]The above configuration embodies the radiation detector of the present invention. That is, the transparent material with a low refractive index is disposed between two adjacent scintillation counter crystals with a high refractive index, whereby the crystals are optically coupled. Under such a condition, fluorescence that travels from the scintillation counter crystal to the transparent material partially reflects on the crystal surface. With the aspect of the present invention, the face of the scintillation counter crystal is a rough surface. This allows suppressed reflection of the fluorescence on the surface of the crystal.

It is more preferred in the radiation detector of the present invention that a surface of the scintillator connected to the light detector is a ground glass rough surface that is rougher than a ground smooth surface.

[Operation and Effect]The above configuration embodies the radiation detector of the present invention. Since the face of the scintillator connected to the light detector is a rough surface, the fluorescence generated in the scintillator positively enters into the light detector without reflecting on the surface of the scintillator partially. This allows ideal optical connection between the scintillator and the light detector. The above configuration contributes to accurate determination of the fluorescence by the radiation detector.

It is more preferred in the radiation detector of the present invention that the rough surfaces of the scintillation counter crystals each have roughness of an extent to which the surfaces of the scintillation counter crystals are processed with abrasive paper of #100 or more to #600 or less.

It is more preferred in the radiation detector of the present invention that the rough surfaces of the scintillation counter crystals each have roughness larger than that of a surface of the scintillation counter crystal subjected to optical grinding.

It is preferred in the radiation detector of the present invention that the rough surfaces of the scintillation counter crystals each have roughness larger than that of a surface of the scintillation counter crystal subjected to chemical etching.

[Operation and Effect]The above configuration embodies the radiation detector of the present invention. The rough surfaces of the scintillation counter crystals having the roughness in the range mentioned above achieve a radiation detector that exerts an effect of the present invention satisfactorily.

It is more preferred in the radiation detector of the present invention that the scintillation counter crystals arranged in the scintillator are disposed across the first layer, the second layer, the third layer, and the fourth layer.

Moreover, it is more preferred in the radiation detector of the present invention that the scintillation counter crystals arranged in the scintillator includes two types, a first type of the scintillation counter crystals being disposed across the first layer and the second layer, a second type of the scintillation counter crystals being disposed across the third layer and the fourth layer.

[Operation and Effect]The above configuration embodies the radiation detector of the present invention. The present invention is applicable to various aspects of the radiation detector.

Moreover, it is preferred that the radiation detector of the present invention further includes scintillator reflectors that cover side faces and a top face of the scintillator when it is assumed that a face of the scintillator to which the light detector is optically connected is a bottom face, and it is preferred that all faces of the scintillation counter crystals constituting the side faces of the scintillator are smooth surfaces.

Moreover, it is preferred that the radiation detector of the present invention further includes scintillator reflectors that cover side faces and a top face of the scintillator when it is assumed that a face to which the light detector is optically connected is a bottom face of the scintillator, and it is preferred that only faces of scintillation counter crystals that form the side faces of the scintillator are smooth surfaces.

[Operation and Effect]The above configuration embodies the radiation detector of the present invention. With the aspect of the present invention, the surfaces of the scintillator formed by the integrated scintillation counter crystals are smooth surfaces. Accordingly, when the fluorescence generated in the scintillator travels to the side face of the scintillator, the fluorescence partially reflects on the side face of the scintillator and returns back into the scintillator. At this time, the fluorescence that has been emitted from the scintillator entirely reflects on the scintillator reflector, and returns back into the scintillator. As noted above, the side face of the scintillator assists a function of the scintillator reflector. Such a configuration as above contributes to accurate determination of the fluorescence by the radiation detector. Six faces of the scintillation counter crystal are smooth surfaces. Accordingly, there is no need to pay attention to a direction of the scintillation counter crystals for assemble of the scintillator, leading to ease production of the scintillator. Moreover, when some of the faces of the scintillation counter crystal are smooth surfaces, ideal optical connection between the adjacent crystals are obtainable. This achieves the radiation detector that allows accurate determination of the fluorescence.

Moreover, it is preferred in the radiation detector of the present invention that the faces of the scintillation counter crystals remain unprocessed in a condition in which a crystal ingot is hewn out.

[Operation and Effect]The above configuration embodies the radiation detector of the present invention. The scintillation counter crystals that constitute the scintillator are produced by hewing a cylindrical crystal ingot with a wire saw or a dicing saw. The scintillation counter crystals immediately subjected to the hewing each have six faces that are rough surfaces. Accordingly, the scintillation counter crystals having the rough surfaces are assembled to produce the scintillator, whereby reflection is suppressed on the optical connected surface of the adjacent scintillation counter crystals. That is, the above configuration achieves the scintillator with the effect of the present invention. In addition, the above configuration has no need to grind the surfaces of the scintillation counter crystals. This achieves a shortened production process, whereby a radiation detector with low costs is able to be provided.

Advantageous Effects of Invention

The radiation detector according to one aspect of the present invention includes the scintillation counter crystals whose faces are rough surfaces. This allows suppression of unexpected partial reflection of fluorescence between adjacent scintillation counter crystals, leading to ideal spread of the fluorescence generated in the scintillator. Consequently, the present invention provides the radiation detector that allows accurate discrimination of the generating positions of the fluorescence.

BRIEF DESCRIPTION OF DRAWINGS

FIGS. 8 and 9 are each a schematic view illustrating a property of the scintillation counter crystal according to the Embodiment 1.

FIGS. 10 to 16 are each a schematic view illustrating an effect of the radiation detector according to the Embodiment 1.

FIGS. 17 to 19 are each a sectional view illustrating a radiation detector according to one modification of the present invention.

DESCRIPTION OF EMBODIMENTS

The following describes detailed examples as embodiments.

Embodiment 1

(1) Overall Configuration of Radiation Detector 1

Figure 1:
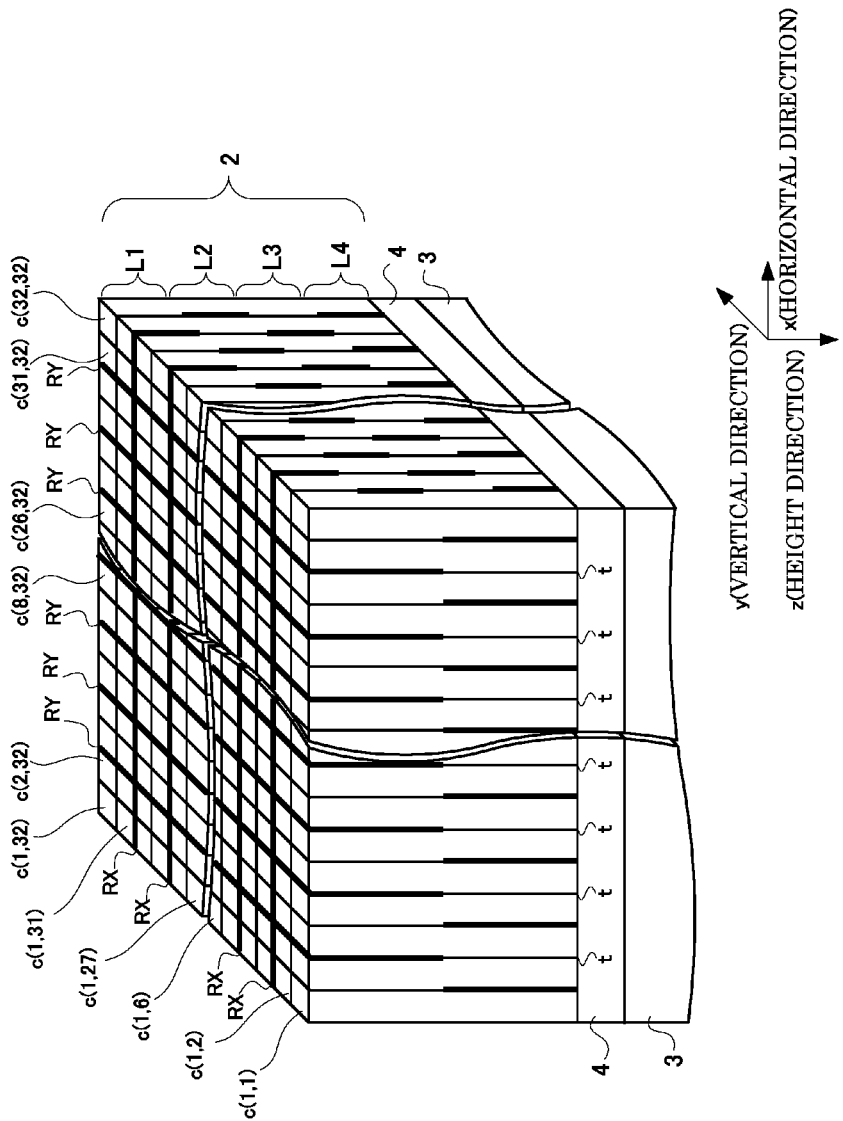
FIG. 1 is a perspective view illustrating an entire configuration of a radiation detector according to Preferred Embodiment 1 of the present invention.

As illustrated in FIG. 1, a radiation detector according to Embodiment 1 includes a scintillator 2, a silicon photomultiplier array (hereinafter, referred to as SiPMA 3), and a light guide 4. The scintillator 2 includes scintillation counter crystals c for converting radiation into fluorescence. The scintillation counter crystals c are arranged in a matrix, and form four layers, i.e., first to fourth layers L1 to L4, respectively, in a height direction. The SiPMA 3 is optically connected to the scintillator 2. The light guide 4 is disposed between the scintillator 2 and the SiPMA 3. The SiPMA 3 includes silicon photomultipliers of semiconductor elements that detect fluorescence. The silicon photomultipliers are arranged in a two-dimensional matrix. The silicon photomultipliers allow positional discrimination of incident fluorescence in x- and y-(horizontal and vertical) directions. The light guide 4 is provided for guiding the fluorescence generated in the scintillator 2 to the SiPMA 3. Consequently, the light guide 4 is optically connected to the scintillator 2 and the SiPMA 3. The SiPMA 3 corresponds to the light detector in the present invention.

(2) Configuration of Scintillator

The scintillator 2 includes the scintillation counter crystals c for converting radiation into fluorescence, the scintillation counter crystals c being arranged two-dimensionally in the x- and y-directions. The scintillator 2 includes four layers, i.e., a first layer L1 to a fourth layer L4, in a z-direction. That is, the scintillator 2 is formed by scintillation counter crystals c in a quadrangular prism shape elongated in the z-direction (height direction) being arranged two-dimensionally. The scintillation counter crystals c are each composed of Ce-doped $Lu_{2(1-X)}Gd_{2X}SiO_5$ (hereinafter referred to as LYSO). Moreover, the scintillation counter crystals c each have a rectangular solid shape whose width in the x-direction is 3 mm, whose width in the y-direction is 3 mm, and whose height in the z-direction is 20 mm. In addition, the scintillator 2 includes four side end faces each covered with a reflective film not shown. The scintillation counter crystals c are disposed across the first layer L1 to the fourth layer L4 of the scintillator 2.

Fluorescence emitted in the scintillator 2 is discriminated with the SiPMA 3 optically connected to the scintillator 2 via the light guide 4 and detecting the fluorescence. That is, the SiPMA 3 allows discrimination of from which of scintillation counter crystals c the fluorescence generated in the scintillator 2 is emitted. That is, the SiPMA 3 has an ability of discriminating generating positions of the fluorescence in the scintillator 2 in the x-direction and the y-direction.

The SiPMA 3 also allows discrimination of a generating position of fluorescence in the scintillator 2 in the z-direction. That is, the SiPMA 3 allows discrimination of from which of the four layers in the scintillator 2 the fluorescence is emitted. In other words, the scintillator 2 is divided into four regions in the z-direction. Such divided regions are to be referred to as the first layer L1, a second layer L2, a third layer L3, and the fourth layer L4 in turn. A layer of the four layers that is disposed adjacent to an incident face of the scintillator 2 to which radiation enters is referred to as the first layer L1, and a layer of the four layers of the scintillator 2 that is disposed adjacent to the light guide 4 is referred to as the fourth layer L4. Accordingly, the scintillation counter crystals c constituting the scintillator 2 are each disposed across the layers L1, L2, L3, and L4. The layers L1, L2, L3, and L4 each have a height of 5 mm in the z-direction.

A transparent material t through which the fluorescence passes is disposed between adjacent scintillation counter crystals c. The transparent material t is also formed between the scintillation counter crystal c and the reflector. The transparent material t is coupled to the scintillation counter crystals c and the reflector to have another function of forming the scintillator 2. The transparent material t has a thickness of around 25 μm between the scintillation counter crystal c and the reflector. A thermosetting resin composed of a silicon resin is adoptable for the transparent material t.

The scintillation counter crystals c are each composed of LGSO. The LGSO is a material with a high refractive index of around 1.82. The silicon resin forming the transparent material t is a material with a low refractive index of around 1.41. As noted above, the adjacent scintillation counter crystals c constituting the scintillator 2 are coupled with the transparent material t whose refractive index is lower than that forming the scintillation counter crystals c.

(3) Configuration of Reflector

The following describes the reflectors. The scintillator 2 includes a reflector RX and a reflector RY that extend in a gap between adjacent scintillation counter crystals c in the x-direction (horizontal direction) and the y-direction (vertical direction), respectively, for reflecting fluorescence. As illustrated in FIG. 1, the reflectors RX and RY are each formed by a plastic film, such as a polyester film, between adjacent scintillation counter crystals c, and each have a thickness of 125 μm, for example. The reflector RX corresponds to the reflector that extends in the horizontal direction in the present invention, and the reflector RY corresponds to the reflector that extends in the vertical direction in the present invention.

<Regarding Reflector RY>

Figure 2:
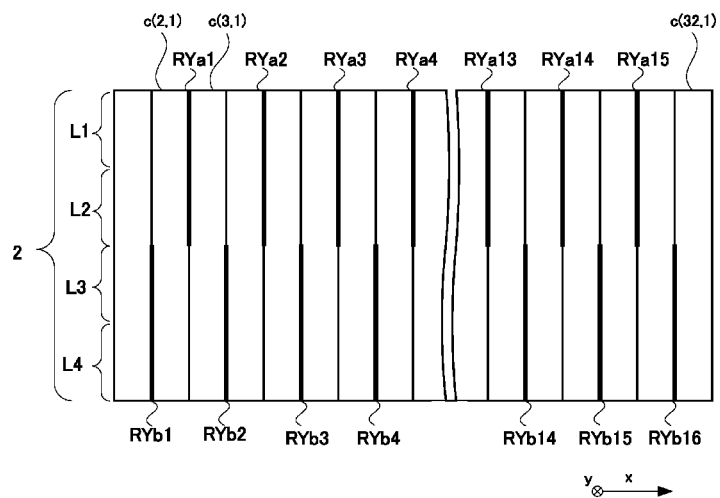
FIGS. 2 and 3 are each a plan view illustrating reflectors according to the Embodiment 1.

The following firstly describes the reflector RY. FIG. 2 illustrates a plan view of the scintillator according to Embodiment 1 seen from its zx-side end face. As illustrated in FIG. 2, every reflector RY is planar and extends in the y-direction and the z-direction. A reflector RYa extending in the y-direction is inserted between a gap of adjacent scintillation counter crystals c in the first layer L1 and the second layer L2. The reflector RYa is, for example, inserted between scintillation counter crystals c(2,1) and c(3,1) of 32 scintillation counter crystals c arranged in the x-direction. As noted above, scintillation counter crystal c with even numbers in the x-direction are each disposed on the immediate left of the reflector RYa, and scintillation counter crystals c with odd numbers in the x-direction are each disposed on the immediate right of the reflector RYa. The reflector RYa is provided across the first layer L1 and the second layer L2, and 15 reflectors RYa are disposed in the entire scintillator 2. The reflectors RYa are each provided across the first layer L1 and the second layer L2 of the scintillator 2, and are arranged in the x-direction at intervals by two scintillation counter crystals c2. The reflectors RYa each have a height in the z-direction of 10 mm, for example, which height corresponds to two layers. As noted above, the reflectors RYa each have the height equal to the sum of the heights of the first layer L1 and the second layer L2.

A reflector RYb extending in the y-direction is inserted in a gap between adjacent scintillation counter crystals c in the third layer L3 and the fourth layer L4 in the same manner. However, the reflector RYb is inserted at a position different from that of the reflector RYa. That is, scintillation counter crystals c with odd numbers in the x-direction are each disposed on the immediate left of the reflector RYb, and scintillation counter crystals c with even numbers in the x-direction are each disposed on the immediate right of the reflector RYb. The reflector RYb is provided across the third layer L3 and the fourth layer L4, and 16 reflectors RYb are disposed in the entire scintillator 2. The reflectors RYb are each provided across the third layer L3 and the fourth layer L4 of the scintillator 2, and are arranged in the x-direction at intervals by two scintillation counter crystals c2. The reflectors RYb each have a height in the z-direction of 10 mm, for example, which height corresponds to two layers. As noted above, the reflectors RYb each have the height equal to the sum of the heights of the third layer L3 and the fourth layer L4.

As noted above, the reflectors RYa provided in the first layer L1 and the second layer L2 are arranged in the horizontal direction at intervals by two scintillation counter crystals so as to appear at the same position of the two layers. Similarly, the reflectors RYa and RYb provided in the second layer L2 and the third layer L3, respectively, are arranged at intervals by one scintillation counter crystal so as to appear alternately in the two layers. Similarly, the reflectors RYb provided in the third layer L3 and the fourth layer L4 are arranged in the horizontal direction at intervals by two scintillation counter crystals so as to appear at the same position of the two layers.

<Regarding Reflector RX>

Figure 3:
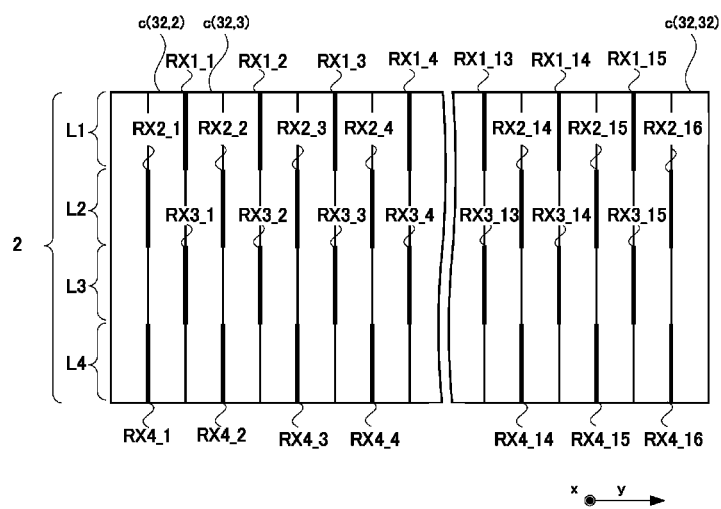

The following describes a yz-side end face of the scintillator according to the present embodiment. FIG. 3 is a plan view of the scintillator according to Embodiment 1 seen from its yz-side end face. As illustrated in FIG. 3, the reflectors RX extending in the x-direction are each inserted into a gap between adjacent scintillation counter crystals c in each of the layers. In addition, the reflectors RX each have a height in the z-direction of 5 mm, for example, which height corresponds to one layer. The reflectors RX are each planar and extend in the x-direction and the z-direction. As noted above, the reflectors RX each have the height equal to that of the layers L1, L2, L3, and L4, respectively.

A reflector RX1 is inserted into a gap between adjacent scintillation counter crystals c in the first layer L1, and a reflector RX2 is inserted into a gap between adjacent scintillation counter crystals c in the second layer L2. The reflector RX1 is inserted, for example, between adjacent scintillation counter crystals c(32,2) and c(32,3) of 32 scintillation counter crystals c arranged in the y-direction. As noted above, scintillation counter crystals c with even numbers in the y-direction are each disposed on the immediate left of the reflector RX1, and scintillation counter crystals c with odd numbers in the y-direction are each disposed on the immediate right of the reflector RX1. In contrast to this, the reflectors RX2 are each inserted into a position in the scintillation counter crystal layer which differs from that of the reflectors RX1. That is, scintillation counter crystals c with odd numbers in the y-direction are each disposed on the immediate left of the reflector RX2, and scintillation counter crystals c with even numbers in the y-direction are each disposed on the immediate right of the reflector RX2. Here, 15 reflectors RX1 are provided in the first layer L1, and 16 reflectors RX2 are provided in the second layer L2. As noted above, the reflectors RX1 and RX2 are arranged in the y-direction at intervals by one scintillation counter crystal c1 so as to appear alternately in the first layer L1 and the second layer L2 of the scintillator 2. The reflectors RX1 each have the height equal to that of the first layer L1, and the reflectors RX2 each have the height equal to that of the second layer L2.

A reflector RX3 is inserted into a gap between adjacent scintillation counter crystals c in the third layer L3. The reflector RX3 is inserted into the scintillator 2 at the same position as that of the reflector RX1. Similarly, a reflector RX4 is inserted into a gap between adjacent scintillation counter crystals c in the fourth layer L4. The reflector RX4 is inserted into the scintillator 2 at the same position as that of the reflector RX2. That is, scintillation counter crystals c with even numbers in the y-direction are each disposed on the immediate left of the reflector RX3, and scintillation counter crystals c with odd numbers in the y-direction are each disposed on the immediate right of the reflector RX3. Then scintillation counter crystals c with odd numbers in the y-direction are each disposed on the immediate left of the reflector RX4, and scintillation counter crystals c with even numbers in the y-direction are disposed on the immediate right of the reflector RX4. Here, 15 reflectors RX3 are provided in the third layer L3, and 16 reflectors RX4 are provided in the fourth layer L4. As noted above, the reflectors RX3 and RX4 are arranged in the y-direction at intervals by one scintillation counter crystal c1 so as to appear alternately in the third layer L3 and the fourth layer L4 of the scintillator 2. The reflectors RX3 each have the height equal to that of the third layer L3, and the reflectors RX4 each have the height equal to that of the fourth layer L4.

As noted above, the reflectors RX1 and RX2 provided in the first layer L1 and the second layer L2, respectively, are arranged in the vertical direction at intervals by one scintillation counter crystal so as to appear alternately in the two layers. Similarly, the reflectors RX2 and RX3 provided in the second layer L2 and the third layer L3, respectively, are arranged in the vertical direction by one scintillation counter crystal so as to appear alternately in the two layers. Similarly, the reflectors RX3 and RX4 provided in the third layer L3 and the fourth layer L4, respectively, are arranged in the vertical direction by one scintillation counter crystal so as to appear alternately in the two layers.

<How to Discriminate Generating Position of Fluorescence>

The following describes how to discriminate generating positions of fluorescence in the x-, y-, and z-directions by the radiation detector 1 according to Embodiment 1. Here, γ-rays incident into the scintillator 2 are converted into fluorescence at any of four regions. The fluorescence travels to the light guide 4, and enters into the SiPMA 3 through the light guide 4. The SiPMA 3 is of a multi-anode type, and thus voltage of detection signals to be outputted varies in a step manner depending on incidence positions. Accordingly, positions in the x- and y-directions of fluorescence entering into the SiPMA 3 are able to be discriminated.

Figure 4:
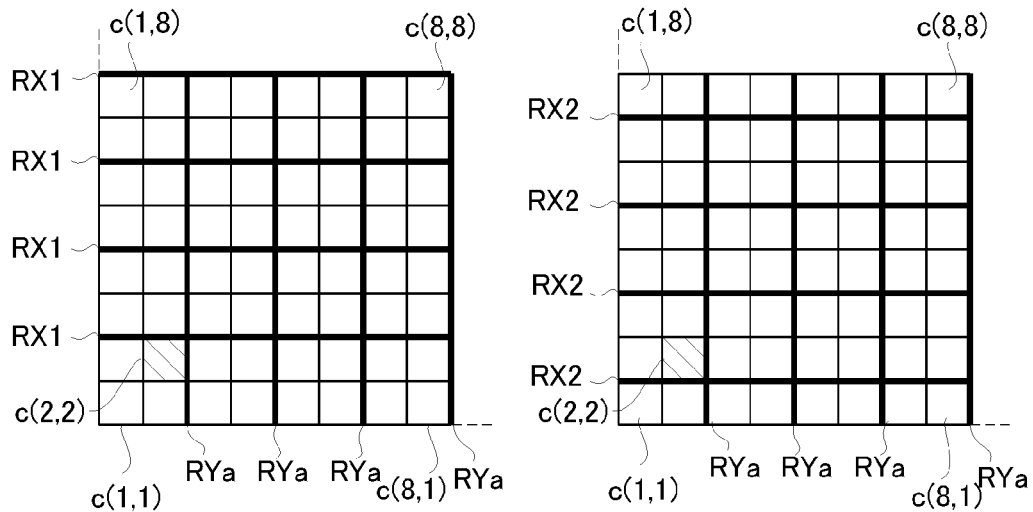
FIGS. 4 and 5 are each a schematic view illustrating how to discriminate a generating position of fluorescence in a height direction by the radiation detector according to the Embodiment 1.
Figure 5:
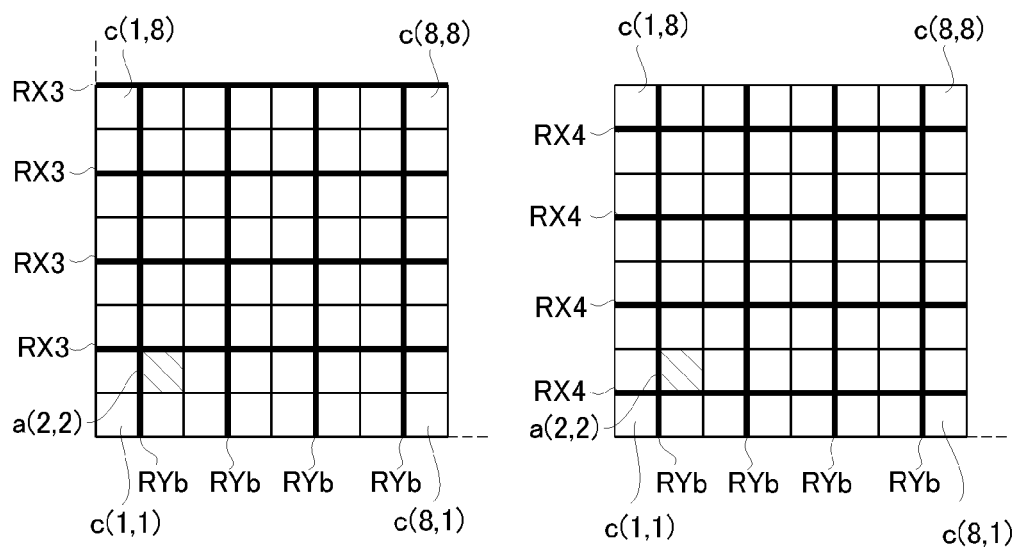

The following describes how a generating position of fluorescence in the z-direction is discriminated by the radiation detector 1 with reference to FIGS. 4 and 5. As illustrated in FIGS. 4 and 5, the reflector RX differs from the reflector RY in insertion position in four regions of the scintillator 2. Now focusing attention on a scintillation counter crystal c(2,2) (diagonally shaded in FIGS. 4 and 5) disposed at a position (2,2) in FIGS. 4 and 5 reveals that the reflectors RX and RY differ from each other in insertion position in the four regions. The fluorescence generated in the scintillation counter crystal c reaches the SiPMA 3 while spreading in the x- and y-directions. Provision of the reflectors RX and RY applies a directional property to the spread. Moreover, comparison of the fluorescence generated in the same xy-position in the layers L1, L2, L3, and L4 reveals that the fluorescence spreads in different directions. That is, a difference in generating position of fluorescence in the z-direction in the scintillator 2 is converted into a difference in position in the x- and y-directions of the fluorescence. The SiPMA 3 detects a slight shift of the fluorescence in the x- and y-directions caused by the difference in position in the z-direction, and then allows determination of at which of the layers L1, L2, L3, and L4 the generating position of fluorescence in the z-direction is present.

(4) Regarding Scintillator Reflector S

Figure 6:
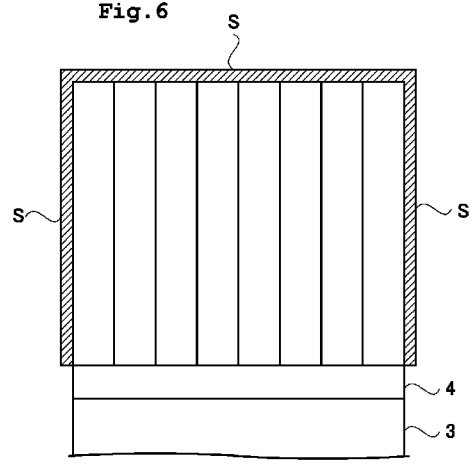
FIG. 6 is a sectional view illustrating scintillator reflectors according to the Embodiment 1.

The scintillator 2 in a rectangular solid shape includes six faces. One of the faces corresponds to an emission face of the fluorescence coupled to the light guide 4. As illustrated in FIG. 6, scintillator reflectors S are disposed on five of the six faces of the scintillator 2 individually other than the emission face. The scintillator reflectors S are each made of a material same as that of the reflectors RX and RY each disposed in the gap between adjacent scintillation counter crystals c, and are integrated with the scintillator 2 via a transparent material t containing a cured silicon resin. The scintillator reflectors S are provided for preventing the fluorescence generated in the scintillator 2 from dispersing from the faces other than the emission face. As noted above, the scintillator reflectors S serve to focus the fluorescence onto the SiPMA 3.

Figure 7:
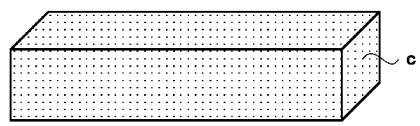
FIG. 7 is a perspective view illustrating a scintillation counter crystal according to the Embodiment 1.

(5) Regarding Configuration of Face of Scintillation Counter Crystal c: Most Characteristic Feature in Present Invention The following describes the most characteristic feature of the present invention. The present invention has the characteristic feature in configuration of the scintillation counter crystal c that constitutes the scintillator 2. As illustrated in FIG. 7, the scintillation counter crystal c is a rectangular solid with six faces. The six faces of the scintillation counter crystal c in the present invention are each a rough surface. The rough surface is a face rougher than a ground smooth surface, and has a texture like a ground glass in appearance. Here, the smooth surface is a face subjected to grinding to an extent that an interior of the crystal is transparent. FIG. 7 illustrates a condition in which the surface of the scintillation counter crystal c is rough with hatches. As noted above, a face of the scintillation counter crystal c constituting the scintillator 2 that is directed to the next scintillation counter crystal c is rough. As a result, with the feature of Embodiment 1, rough surfaces are coupled to one another via the transparent material t, achieving optical connection between the adjacent scintillation counter crystals c.

The rough surface of the scintillation counter crystal c has roughness of an extent to which the surface of the scintillation counter crystal c is processed with abrasive paper of #100 or more to #600 or less. Consequently, the roughness of the rough surface of the scintillation counter crystal c is higher than that of the surface of the scintillation counter crystal c subjected to optical grinding, and thus higher than the surface of the scintillation counter crystal c subjected to a chemical etching processing.

The following describes why the face of the scintillation counter crystal c is rough. The surface of the currently-used scintillation counter crystal c is subjected to grinding so as to be smooth. Such grinding is performed in order to obtain easy assemble and prevent attenuation of fluorescence emitted from the scintillation counter crystal c. On the other hand, the smooth surface of the scintillation counter crystal c may lead to a drawback that fluorescence partially reflects on the surface of the scintillation counter crystal.

The following describes the drawback. The scintillation counter crystal c constituting the scintillator 2 includes a part that contacts to the reflector RX or RY via the transparent material t, and a part that contacts to the next scintillation counter crystal c via the transparent material t. Accordingly, both the parts contact to the transparent material t. Here, the transparent material t has a refractive index lower than the refractive index of the scintillation counter crystal c. Such difference in refractive index between the scintillation counter crystal c and the transparent material t may cause partial reflection of the fluorescence.

Figure 8:
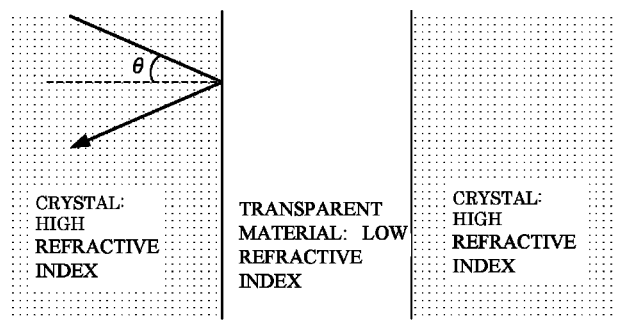

Specifically, when fluorescence traveling inside the scintillation counter crystal c with a high refractive index enters into the transparent material t with a low refractive index, fluorescence may partially reflect without entering into the transparent material t. That is, as illustrated in FIG. 8, when a component of fluorescence in the scintillation counter crystal c travels to the transparent material t at an angle of incidence θ, the component of fluorescence entirely reflects on the surface of the scintillation counter crystal c, and turns back on the surface of the scintillation counter crystal c without being emitted from the scintillation counter crystal c. Here, the angle of incidence θ is larger than a critical angle determined with the refractive index of the scintillation counter crystal c and the refractive index of the transparent material t. Accordingly, no component of fluorescence enters into the transparent material t. The reflected fluorescence travels on a path different from transparent light incident into the transparent material t, and is to be detected by the SiPMA 3. Consequently, since the reflected fluorescence is also detected, no specific drawback is likely to occur if the fluorescence entirely reflects on an interface. However, such reflection is not originally conceivable, and thus the following drawback may occur. That is, when the fluorescence reflects inside the scintillation counter crystal c, a difference in optical environment becomes large between the two adjacent scintillation counter crystals c optically connected to each other via the transparent material t.

As illustrated in FIG. 9, when the surface of the scintillation counter crystal c is rough as in the present invention, the fluorescence is unlikely to reflect entirely on the surface of the scintillation counter crystal c even if the fluorescence in the scintillation counter crystal c enters to the transparent material t at an angle of incidence θ larger than the critical angle. Suppressed reflection on the surface of the crystal is obtainable because of a mechanism as under. That is, when the scintillation counter crystal c has a rough surface layer of the scintillation counter crystal c between the interior of the scintillation counter crystal c and the transparent material t, the surface layer causes reduction in discontinuity of the refractive index between the scintillation counter crystal c and the transparent material t, leading to an attenuated property caused by the difference in refractive index between the crystal and the transparent material.

<Regarding Improvement of Space Resolution in Height Direction>

With the present invention, a space resolution of the radiation detector 1 in the height direction is improved. The following describes such improvement. Prior to description of the improvement, a principle of conventional position discrimination in the scintillator 2 in the height direction is to be described in detail. Here, the conventional discrimination is made in the case in which the scintillation counter crystals c constituting the scintillator 2 each have smooth surfaces. FIG. 10 illustrates the center of the scintillator 2 and its surrounding. In the drawing, the center of the scintillator 2 is denoted by a numeral G corresponding to the center of the scintillator 2 in both of the x-direction and the y-direction. The scintillator 2 includes four scintillation counter crystals c, denoted by numerals A, B, C, and D. The scintillation counter crystals c surround the center G. Hereinunder, it is considered when the four scintillation counter crystals c each emit fluorescence.

FIG. 11 illustrates a case in which fluorescence is generated in the first layer L1 to the fourth layer L4 in the four scintillation counter crystals c. Assuming that fluorescence is generated in the four scintillation counter crystals c, the fluorescence is generated in each of the scintillation counter crystals c. The SiPMA 3 calculates a barycenter of the generated fluorescence individually, whereby it is determinable which of the scintillation counter crystals c the fluorescence is derived from.

FIG. 11 illustrates on the upper left thereof a case in which fluorescence is generated in the first layer L1 of the four scintillation counter crystals c. When the SiPMA 3 detects generation of the fluorescence in the scintillation counter crystals c, positions of barycenter identified by the SiPMA 3 should appear at the centers of the scintillation counter crystals c. However, as illustrated in FIG. 12 on the upper left thereof, the reflectors RX and RY are provided in the first layer L1. Consequently, spread of the fluorescence generated in the scintillation counter crystals c is deflected. The positions of barycenters detected by the SiPMA 3 are each shifted slightly from the center of the scintillation counter crystal c in which the fluorescence is generated.

FIG. 11 illustrates on the upper left thereof positions of barycenters of the fluorescence detected by the SiPMA 3 when the fluorescence is generated in the first layer L1 of the four scintillation counter crystals c. As illustrated by a circle mark in FIG. 11 on the upper left thereof, the barycenter of the fluorescence generated in the first layer L1 in the scintillation counter crystal A disposed on the upper left from the center G of the scintillator 2 appears at a position shifted toward the upper left from the center of the scintillation counter crystal A. Moreover, the barycenter of the fluorescence generated in the first layer L1 in the scintillation counter crystal B disposed on the upper right from the center G of the scintillator 2 appears at a position shifted toward the upper right from the center of the scintillation counter crystal B. Similarly, the barycenter of the fluorescence generated in the first layer L1 in the scintillation counter crystal C disposed on the lower left from the center G of the scintillator 2 appears at a position shifted toward the lower left from the center of the scintillation counter crystal C. Moreover, the barycenter of the fluorescence generated in the first layer L1 in the scintillation counter crystal D disposed on the lower right from the center G of the scintillator 2 appears at a position shifted toward the lower right from the center of the scintillation counter crystal D.

Since the reflectors RX and RY are provided in the second layer L2 to the fourth layer L4, the SiPMA 3 still detects a position shifted slightly from the center of the scintillation counter crystal c as the barycenter of the fluorescence even when the fluorescence is generated in the second layer L2 to the fourth layer L4. However, the reflectors RX and RY are inserted in the second layer L2 to the fourth layer L4 at different positions from that in the first layer L1. Consequently, the barycenters of the fluorescence generated in the second layer L2 to the fourth layer L4 are each shifted in a different manner from that in the first layer L1.

FIG. 11 illustrates on the upper right thereof a case in which fluorescence is generated in the second layer L2 in the four scintillation counter crystals c. When the SiPMA 3 detects generation of the fluorescence in the scintillation counter crystals c, positions of barycenters identified by the SiPMA 3 should appear at the centers of the scintillation counter crystals c individually. However, as illustrated in FIG. 12 on the upper right thereof, the reflectors RX and RY are provided in the second layer L2. Consequently, spread of the fluorescence generated in the scintillation counter crystals c is deflected. The positions of barycenters detected by the SiPMA 3 are each shifted slightly from the center of the scintillation counter crystal c in which the fluorescence is generated.

Specifically, as illustrated by a triangle mark in FIG. 11 on the upper right thereof, the barycenter of the fluorescence generated in the second layer L2 in the scintillation counter crystal A appears at a position deviated toward the lower left from the center of the scintillation counter crystal A. Moreover, the barycenter of the fluorescence generated in the second layer L2 in the scintillation counter crystal B appears at a position shifted toward the lower right from the center of the scintillation counter crystal B. Similarly, the barycenter of the fluorescence generated in the second layer L2 in the scintillation counter crystal C appears at a position shifted toward the upper left from the center of the scintillation counter crystal C. Moreover, the barycenter of the fluorescence generated in the second layer L2 in the scintillation counter crystal D appears at a position shifted toward the upper right from the center of the scintillation counter crystal D.

FIG. 11 illustrates on the lower left thereof a case in which fluorescence is generated in the third layer L3 in the four scintillation counter crystals c. When the SiPMA 3 detects generation of the fluorescence in the scintillation counter crystals c, positions of barycenters identified by the SiPMA 3 should appear at the centers of the scintillation counter crystals c individually. However, as illustrated in FIG. 12 on the lower left thereof, the reflectors RX and RY are provided in the third layer L3. Consequently, spread of the fluorescence generated in the scintillation counter crystals c is deflected. The positions of barycenters detected by the SiPMA 3 are each shifted slightly from the center of the scintillation counter crystal c in which the fluorescence is generated.

Specifically, as illustrated by an X mark in FIG. 11 on the lower left thereof, the barycenter of the fluorescence generated in the third layer L3 in the scintillation counter crystal A appears at a position shifted toward the upper right from the center of the scintillation counter crystal A. Moreover, the barycenter of the fluorescence generated in the third layer L3 in the scintillation counter crystal B appears at a position shifted toward the upper left from the center of the scintillation counter crystal B. Similarly, the barycenter of the fluorescence generated in the third layer L3 in the scintillation counter crystal C appears at a position shifted toward the lower right from the center of the scintillation counter crystal C. Moreover, the barycenter of the fluorescence generated in the third layer L3 in the scintillation counter crystal D appears at a position shifted toward the lower left from the center of the scintillation counter crystal D.

FIG. 11 illustrates on the lower right thereof a case in which fluorescence is generated in the fourth layer L4 in the four scintillation counter crystals c. When the SiPMA 3 detects generation of the fluorescence in the scintillation counter crystals c, positions of barycenters identified by the SiPMA 3 should appear at the centers of the scintillation counter crystals c individually. However, as illustrated in FIG. 12 on the lower right thereof, the reflectors RX and RY are provided in the fourth layer L4. Consequently, spread of the fluorescence generated in the scintillation counter crystals c is deflected. The positions of barycenters detected by the SiPMA 3 are each shifted slightly from the center of the scintillation counter crystal c in which the fluorescence is generated.

Specifically, as illustrated by a square mark in FIG. 11 on the lower right thereof, the barycenter of the fluorescence generated in the fourth layer L4 in the scintillation counter crystal A appears at a position shifted toward the lower right from the center of the scintillation counter crystal A. Moreover, the barycenter of the fluorescence generated in the fourth layer L4 in the scintillation counter crystal B appears at a position shifted toward the lower left from the center of the scintillation counter crystal B. Similarly, the barycenter of the fluorescence generated in the fourth layer L4 in the scintillation counter crystal C appears at a position shifted toward the upper right from the center of the scintillation counter crystal C. Moreover, the barycenter of the fluorescence generated in the fourth layer L3 in the scintillation counter crystal D appears at a position shifted toward the upper left from the center of the scintillation counter crystal D.

FIG. 13 illustrates en block the positions of barycenters in the layers L1 to L4 in FIG. 11. It should be noted that the fluorescence generated in the layers has the barycenters that do not overlap one another. Consequently, the SiPMA 3 allows discrimination and detection of the barycenters. It is originally impossible to discriminate the fluorescence generated in the four layers L1 to L4 in the same scintillation counter crystal. However, the fluorescence generated in the same scintillation counter crystal spreads in different manners depending on the layers where the fluorescence is generated, and the fluorescence is detected by the SiPMA 3. Consequently, discrimination of a direction in which the fluorescence is shifted from the center of the scintillation counter crystal allows identification of from which layer the fluorescence is generated.

At this time, a problem about a shift amount of barycenter arises. When the shift amount of barycenter is small, it is considered that the barycenters of the fluorescence generated in the layers L1 to L4 are each shifted slightly from the center of the scintillation counter crystal. Under such a condition as in FIG. 13 that the barycenters of the fluorescence, denoted by the circle mark, the triangle mark, the X mark, and the square mark, that are derived from the layers L1 to L4, respectively, concentrate around the center of the scintillation counter crystal, it becomes difficult to discriminate the layers in which the fluorescence is generated.

The embodiment of the present invention allows improvement of a space resolution of the fluorescence in the height direction. The following describes the improvement in detail. FIG. 14 illustrates a case in which the scintillator 2 according to the present invention is formed by scintillation counter crystals c with rough surfaces. FIG. 14 corresponds to FIG. 11 having a conventional configuration. For instance, as illustrated by a circle mark on the upper left of FIG. 14, the barycenter of the fluorescence generated in the first layer L1 in the scintillation counter crystal A disposed on the upper left from the center G of the scintillator 2 appears at a position shifted toward the upper left from the center of the scintillation counter crystal A. As noted above, the barycenter of the fluorescence in the scintillator 2 according to the present invention is shifted in the same direction as that of the conventional scintillator 2.

On the other hand, with the configuration of the present invention, a shift amount of barycenter becomes large. FIG. 15 illustrates en block the positions of barycenters in the layers L1 to L4 in FIG. 14 on the left thereof, which corresponds to FIG. 11 with the conventional configuration. It is apparent from FIG. 15 on the left thereof that the barycenters of the fluorescence, denoted by the circle mark, the triangle mark, the X mark, and the square mark, that are derived from the layers L1 to L4, respectively, are shifted relatively to one another, and thus it is easy to determine the barycenters from one another. A condition of the scattered barycenters of the fluorescence is readily understood with reference to a correspondence drawing with the conventional configuration, which is again illustrated on the right of FIG. 15 for comparison.

The following describes a principle of such an effect of the present invention. In FIG. 16, attention is focused on fluorescence generated in the fourth layer L4 of the scintillation counter crystals A, B, C, and D. No reflector RX, RY is provided between adjacent scintillation counter crystals A, B, C, and D in the fourth layer L4, and four sides of the integrated scintillation counter crystals A, B, C, and D are surrounded with the reflectors RX and RY. FIG. 16 illustrates on the upper left thereof a case in which the scintillation counter crystals c have smooth surfaces conventionally. In such a case, fluorescence frequently reflects on surfaces of the four scintillation counter crystal A, B, C, and D arranged in two rows and in two columns as illustrated on the upper left of FIG. 16. Such reflection on the surfaces of the crystals causes optical isolation of the scintillation counter crystals A, B, C, and D.

In the conventional configuration, the scintillation counter crystals A, B, C, and D are optically isolated due to reflection on the surfaces of the crystals. Accordingly, as illustrated by the square mark on the upper right of FIG. 16, the SiPMA 3 is disposed such that the barycenters of the fluorescence derived from the crystals are away from the center G in FIG. 10 individually.

The reflectors RX and RY are provided on the scintillator 2 because of necessity to deflect spread of the fluorescence generated in the scintillator 2. However, if the fluorescence reflects on the surfaces of the scintillation counter crystals A, B, C, and D, differences in direction of spread of the fluorescence to be made by the reflectors RX and RY are partially cancelled on the surfaces of the scintillation counter crystals A, B, C, and D through the reflection of the fluorescence. From such a condition, the barycenters denoted by the square mark on the upper right of FIG. 16 turn back to the centers of the scintillation counter crystals A, B, C, D individually against the reflectors RX and RY.

Consequently, the conventional configuration has difficulty in discrimination of in which of the layers L1, L2, L3, and L4 the fluorescence is generated although which of the scintillation counter crystals the fluorescence in the scintillator is generated in is able to be discriminated. This is because the barycenters of the fluorescence generated in the layers L1, L2, L3, and L4 are disposed closely to one another on a map.

FIG. 16 illustrates on the lower thereof a case in which the scintillation counter crystals c of the present invention have rough surfaces. In such a case, as illustrated on the lower left of FIG. 16, suppressed reflection of fluorescence is obtainable on surfaces of adjacent scintillation counter crystals A, B, C, and D. The scintillation counter crystals A, B, C, and D have an optically close relationship since no reflection occurs on the surfaces of the crystals. Here, the surfaces of the scintillation counter crystals c are rough. Accordingly, four barycenters derived from the fourth layer are disposed closely to one another on the map.

Such a situation is advantageous for discriminating the generating positions of fluorescence in the height direction. The following describes the situation. The scintillation counter crystals of the present invention whose faces are rough surfaces each have a function to enhance an effect by the reflectors RX and RY that deflects spread of the fluorescence. Accordingly, the barycenters derived from the different layers in the same crystal are spaced away from one another. That is, the barycenters with the circle, triangle, X, and square marks derived from the fluorescence in the layers L1, L2, L3, and L4, respectively, in the scintillation counter crystal A are spaced away from one another at different positions on the map. This facilitates discrimination of which of the layers in the scintillation counter crystals the fluorescence is generated in. Such a principle achieves the radiation detector 1 of the present invention with an enhanced space resolution.

When the adjacent barycenters with the circle, triangle, X, and square marks approach to one another over the adjacent scintillation counter crystals, the barycenters are difficult to be discriminated. However, since the barycenters with the circle, triangle, X, and square marks are derived from different scintillation counter crystals, the barycenters are likely to appear at position sufficiently away from one another on the map. Consequently, the barycenters are easy to be discriminated originally. As a result, the rough surfaces of the crystals never degrade the space resolution even when the barycenters with the circle, triangle, X, and square marks approach on the map. Such a situation is applicable in the same manner to barycenters derived from other layers.

Such an enhanced space resolution is especially remarkable on an end of the map. At the end faces of the scintillator 2, barycenters are disposed densely. The barycenters are disposed densely at the end faces of the scintillator 2 because a space at the end faces of the scintillator 2 in which the fluorescence generated is able to spread is narrower than a space at the center of the scintillator 2 in which the fluorescence is able to spread. At the end faces of the scintillator 2, the barycenters are likely to overlap, and accordingly, it is difficult to discriminate the generating positions of fluorescence accurately. With the rough surfaces of the scintillation counter crystals c in the radiation detector 1 of the present invention, barycenters overlapping at the end faces in the map disperse, achieving a more enhanced space resolution.

<Regarding Connection Between Scintillator 2 and Light Guide 4>

The emission face of the scintillator 2 from which the fluorescence is emitted to the SiPMA 3 is optically connected to the light guide 4 via the transparent material t. Since the scintillation counter crystals c constituting the scintillator 2 each include six rough surfaces, the emission face of the scintillator 2 is also a rough surface. The transparent material t connected to the emission face has a refractive index lower than a refractive index of the scintillation counter crystal.

As noted above, the faces of the scintillation counter crystals c in the radiation detector of the present invention are rough surfaces. This suppresses unexpected partial reflection of the fluorescence between adjacent scintillation counter crystals c, leading to ideal spread of the fluorescence generated in the scintillator 2. Consequently, the embodiment of the present invention achieves the radiation detector that allows accurate discrimination of the generating positions of fluorescence.

Moreover, the transparent material t with a low refractive index as the present embodiment is disposed between two adjacent scintillation counter crystals with a high refractive index, and the crystals are optically coupled. Under such a condition, fluorescence that travels from the scintillation counter crystal c to the transparent material t partially reflects on the surface of the crystal. With the present invention, the faces of the scintillation counter crystal c are rough surfaces. This allows suppression of partial reflection of the fluorescence on the surfaces of the crystal.

Moreover, when the face of the scintillator 2 connected to the SiPMA 3 is a rough surface, the fluorescence generated in the scintillator 2 positively enters into the SiPMA 3 without reflecting on the surface of the scintillator 2. This allows ideal optical connection between the scintillator 2 and the SiPMA 3. The above configuration contributes to accurate determination of the fluorescence by the radiation detector.

The present invention is not limited to the above, but may be modified as under.

(1) The scintillation counter crystals c constituting the scintillator 2 in Embodiment 1 each have the same configuration. However, such a configuration is not limitative in the present invention. As illustrated in FIG. 17, scintillation counter crystals c disposed on end faces of the scintillator 2 may have smooth surfaces. In FIG. 17, surfaces of the scintillation counter crystal c with thick lines are smooth surfaces. Here, the smooth surface is a smooth plane obtained by applying optical grinding or chemical etching to the surface of the scintillation counter crystal c. The scintillation counter crystals c disposed on the end faces of the scintillator 2 according to the modification are each a rectangular solid, and each include six planes. The six planes are each a smooth surface subjected to smoothing.

When it is assumed that a bottom face of the scintillator 2 is a surface to which the SiPMA 3 is optically connected, all the faces of scintillation counter crystals c that form the side faces of the scintillator 2 are smooth surfaces.

With the modification of the present invention, the faces of the scintillator 2 constituted by integrated scintillation counter crystals c are smooth surfaces. Consequently, when the fluorescence generated in the scintillator 2 travels to the side faces of the scintillator 2, the fluorescence partially reflects on the side faces of the scintillator 2 and returns back into the scintillator 2. At this time, the fluorescence already emitted from the scintillator 2 entirely reflects on the scintillator reflector S, and also returns back into the scintillator 2. As noted above, the side faces of the scintillator 2 assist a function of the scintillator reflectors S. In addition, when the side faces of the scintillator 2 are smooth surfaces, no attenuation of the fluorescence occurs while the fluorescence is emitted from the side faces of the scintillator 2, reflects on the scintillator reflectors S, and returns back again into the side faces of the scintillator 2. Consequently, the modification contributes to accurate determination of the fluorescence by the radiation detector. Moreover, six faces of the scintillation counter crystal c are smooth surfaces. Accordingly, there is no need to pay attention to a direction of the scintillation counter crystal c for assemble of the scintillator 2, leading to ease production of the scintillator 2.

Figure 18:
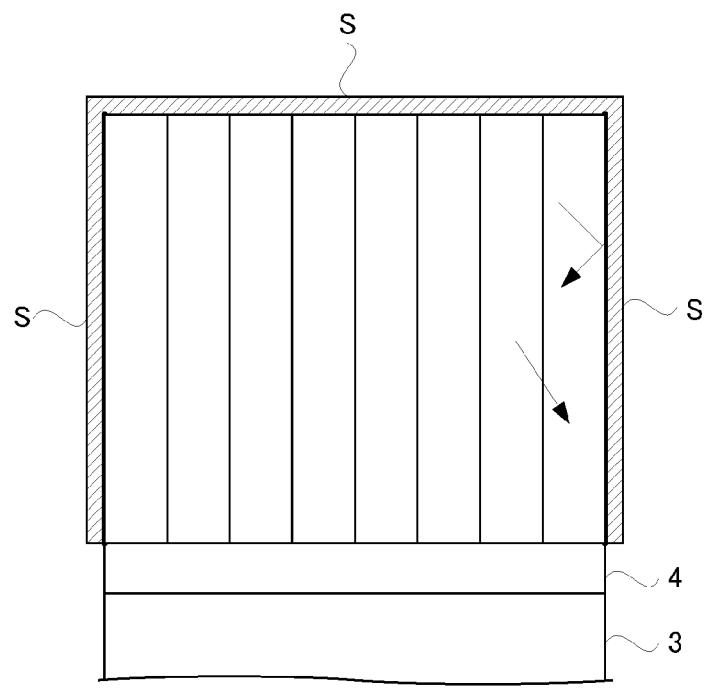

(2) Moreover, the present invention may have a configuration as illustrated in FIG. 18 in which scintillation counter crystals c disposed on the end faces of the scintillator 2 each have a smooth surface. The scintillation counter crystals c illustrated in FIG. 18 each have a smooth surface indicated by a thick line. The scintillation counter crystals c disposed on the end faces of the scintillator 2 are each a rectangular solid, and each include six planes. One of the six planes that is connected to the scintillator reflector S via the transparent material t (i.e., a plane forming the end face of the scintillator 2) is a smooth surface subjected to smoothing, and the other five planes are rough surfaces. In addition, four scintillation counter crystals c disposed at corners of the scintillator 2 each include two planes that are connected to the scintillator reflectors S via the transparent material t (i.e., planes forming the end face of the scintillator 2). Consequently, the two planes are each a smooth surface subjected to smoothing, and the other four planes are rough surfaces. That is, with the modification of the present invention, when it is assumed that a bottom face of the scintillator 2 is a surface to which the SiPMA 3 is optically connected, only faces of scintillation counter crystals c that form the side faces of the scintillator 2 are smooth surfaces.

The present modification also obtains an effect like that by the above modification (1). When some of the faces of the scintillation counter crystal c are smooth surfaces, ideal optical connection between the adjacent crystals is obtainable. This achieves the radiation detector that allows accurate determination of the fluorescence.

(3) In the embodiment mentioned above, the surfaces of the scintillation counter crystals c constituting the scintillator 2 are each processed with the abrasive paper. However, this is not limitative in the present invention. That is, the scintillation counter crystals c hewn out from an LGSO crystal ingot and whose faces are unprocessed may be assembled to form the scintillator 2. The scintillation counter crystals that constitute the scintillator 2 are produced by hewing a cylindrical LYSO ingot with a wire saw or a dicing saw. The scintillation counter crystal c immediately subjected to the hewing has six faces that are each roughened. Accordingly, the scintillation counter crystal c whose faces remain roughened is assembled to produce the scintillator 2, whereby reflection is suppressed on the optical connected surface of the adjacent scintillation counter crystals. The present modification achieves the scintillator 2 that possesses the effect of the present invention. In addition, the present modification has no need to grind the surfaces of the scintillation counter crystals c. This achieves a shortened production process, whereby a radiation detector with low costs is able to be provided.

Figure 19:
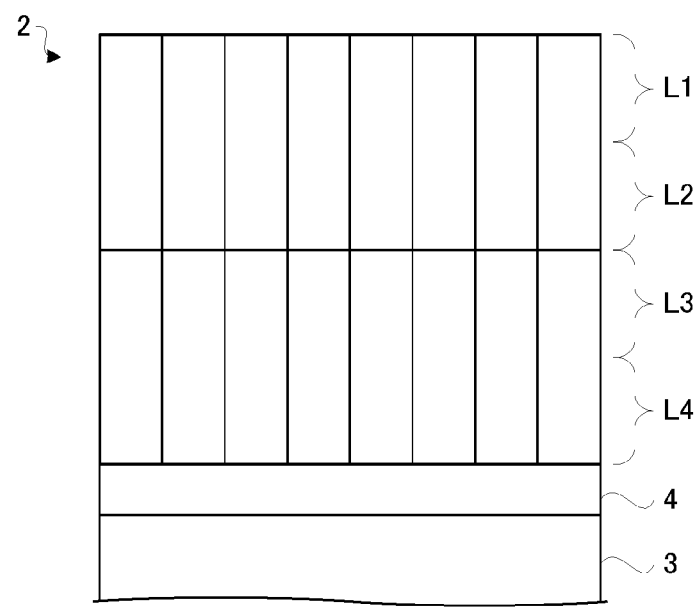
Figure 20:
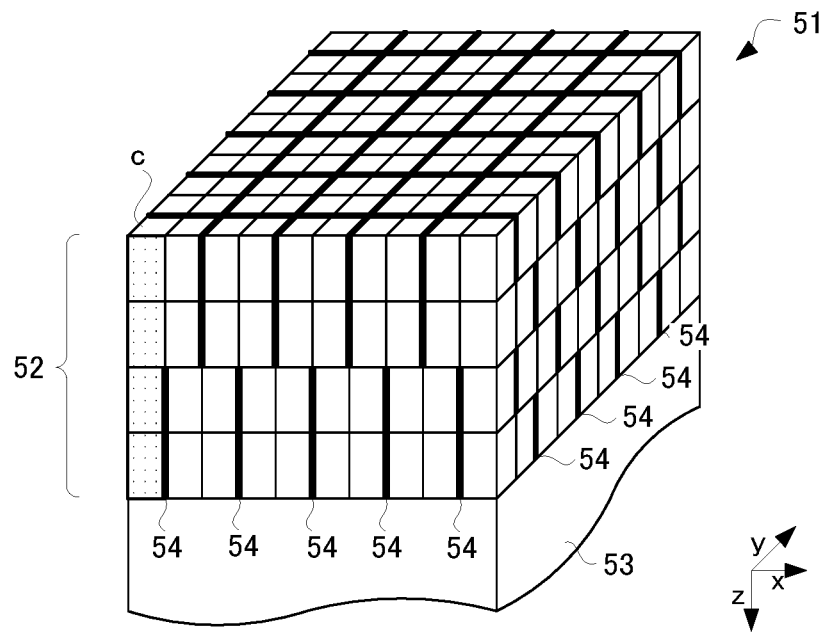
FIGS. 20 and 21 are each a perspective view illustrating a radiation detector of a currently-used apparatus.
Figure 21:
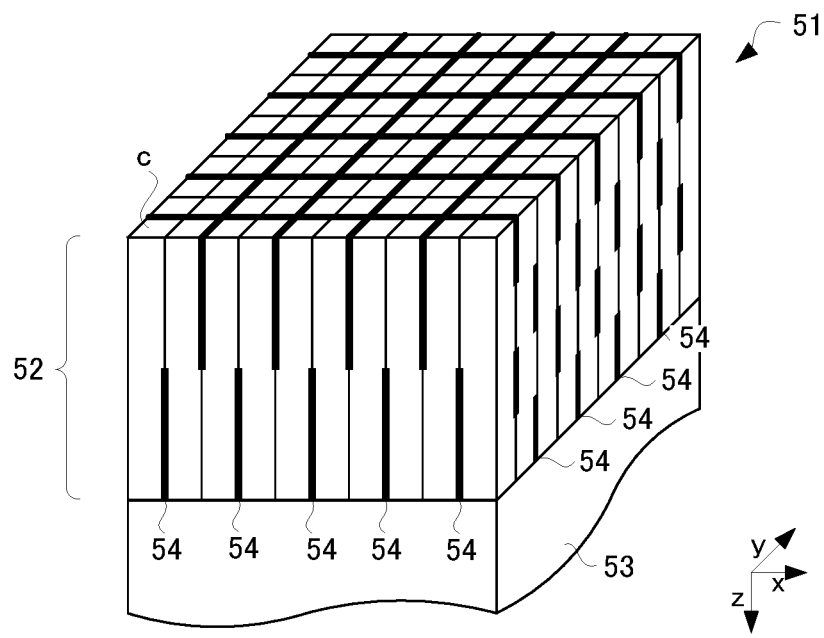
Figure 22:
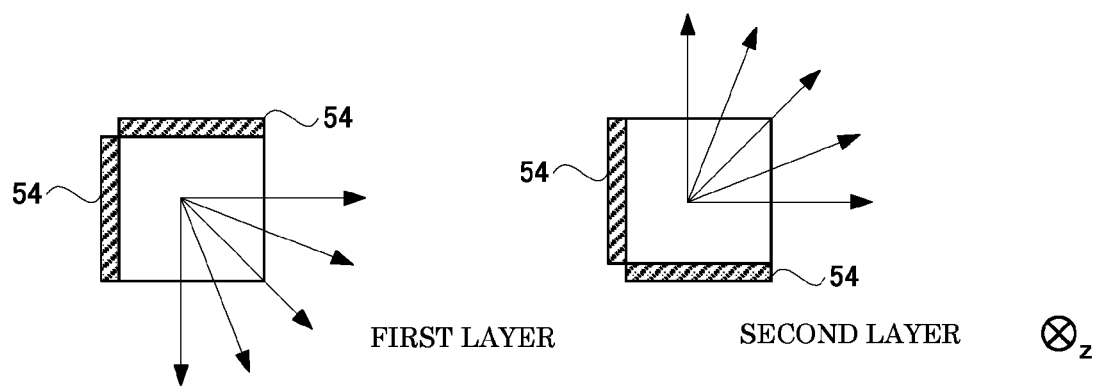
FIG. 22 is a schematic view illustrating the radiation detector of the currently-used apparatus.
Figure 23:
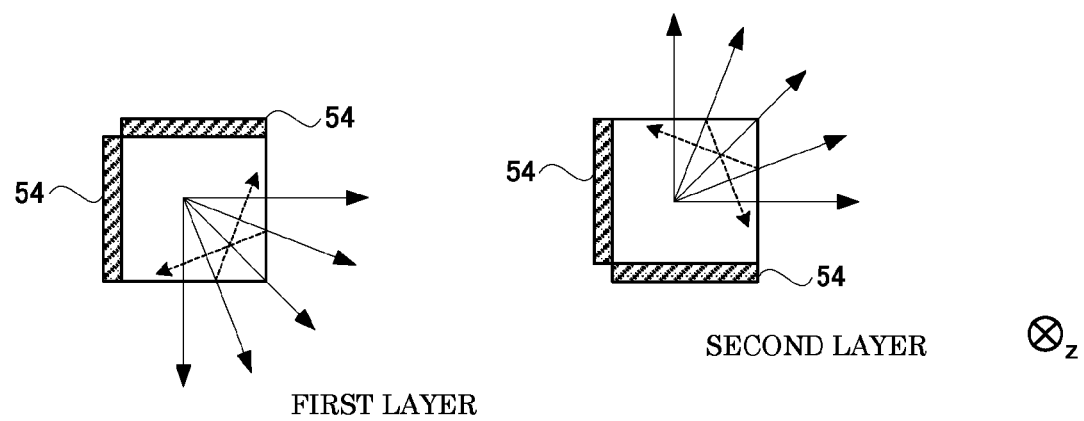
FIG. 23 is a schematic view illustrating a drawback of the radiation detector of the currently-used apparatus.

(4) In the above embodiment, the scintillator 2 is formed by the scintillation counter crystals c integrally disposed across the first layer L1 to the fourth layer L4. Instead of such a configuration, as illustrated in FIG. 19, the scintillator 2 may be formed by scintillation counter crystal across the first layer L1 and the second layer L2, and scintillation counter crystals across the third layer L3 and the fourth layer L4. In the present modifications, the scintillator 2 includes two types of scintillation counter crystals c, i.e., a first type of the scintillation counter crystals c being arranged across the first layer L1 and the second layer L2, and a second type of the scintillation counter crystals c being arranged across the third layer L3 and the fourth layer L4. As noted above, the present invention is applicable to various aspects of the radiation detector.

(5) In the above embodiment, the reflectors RYa and RYb are disposed across the two layers of the scintillator 2. However, instead of the configuration, the present invention is applicable to a radiation detector having a configuration in which one or both of the reflectors RYa and RYb is divided in each layer of the scintillator 2.

(6) In the above embodiments, LGSO is used as the material of the crystal. However, this is not limitative in the present invention. For instance, another material such as $Lu_{(1-x)}Y_{2x}SiO_5$ (LYSO) and GSO may be used. In addition, another device other than the SiPMA may be used for the light detector.

INDUSTRIAL APPLICABILITY

As noted above, the radiation detector of the present invention is suitable in medical fields.

REFERENCE SIGN LIST c . . . scintillation counter crystal
t . . . transparent material
L1 . . . first layer
L2 . . . second layer
L3 . . . third layer
L4 . . . fourth layer
RX, RY . . . reflector
S scintillator reflector
2 . . . scintillator
3 . . . SiPMA (light detector)

The invention claimed is:

1. A radiation detector comprising:
a scintillator having scintillation counter crystals for converting radiation into fluorescence being arranged in a matrix and having a first layer, a second layer, a third layer, and a fourth layer in a height direction;
a light detector optically connected to the scintillator,
the scintillator further comprising:
a plurality of reflectors that reflects fluorescence, the reflectors including two types arranged in each of the first layer, second layer, third layer and further layer, a first type of the reflectors extending horizontally and a second type of the reflectors extending vertically, wherein the first type of the reflectors in the first layer and the second layer are arranged vertically at intervals by one scintillation counter crystal to appear alternately in the first layer and the second layer, the first type of the reflectors in the second layer and the third layer are arranged vertically at intervals by one scintillation counter crystal to appear alternately in the second layer and the third layer,
the first type of the reflectors in the third layer and the fourth layer are arranged vertically at intervals by one scintillation counter crystal to appear alternately in the third layer and the fourth layer, the second type of the reflectors in the first layer and the second layer are arranged horizontally at intervals by two scintillation counter crystals to appear at an equal position in the first layer and the second layer,
the second type of the reflectors in the second layer and the third layer are arranged horizontally at intervals by one scintillation counter crystal to appear alternately in the second layer and the third layer,
the second type of the reflectors in the third layer and the fourth layer are arranged horizontally at intervals by two scintillation counter crystals to appear at an equal position in the third layer and the fourth layer, and wherein
the scintillation counter crystals each have side faces opposite to one or more adjacent scintillation counter crystals, and the side faces are each a rough ground glass surface rougher than a ground smooth surface.

2. The radiation detector according to claim 1, wherein the adjacent scintillation counter crystals constituting the scintillator are optically coupled via a transparent material whose refractive index is lower than that of a material of which the scintillation counter crystals are composed.

3. The radiation detector according to claim 1, wherein a surface of the scintillator connected to the light detector is a ground glass rough surface that is rougher than a ground smooth surface.

4. The radiation detector according to claim 1, wherein the rough surfaces of the scintillation counter crystals each have a roughness of an extent to which the surfaces of the scintillation counter crystals are processed with abrasive paper of #100 or more to #600 or less.

5. The radiation detector according to claim 1, wherein the rough surfaces of the scintillation counter crystals each have roughness larger than that of a surface of the scintillation counter crystal subjected to optical grinding.

6. The radiation detector according to claim 1, wherein the rough surfaces of the scintillation counter crystals each have roughness larger than that of a surface of the scintillation counter crystal subjected to chemical etching.

7. The radiation detector according to claim 1, wherein the scintillation counter crystals arranged in the scintillator are disposed across the first layer, the second layer, the third layer, and the fourth layer.

8. The radiation detector according to claim 1, wherein the scintillation counter crystals arranged in the scintillator includes two types, a first type of the scintillation counter crystals being scintillation counter crystals disposed across the first layer and the second layer, a second type of scintillation counter crystals being scintillation counter crystals disposed across the third layer and the fourth layer.

9. The radiation detector according to claim 1, further comprising:
scintillator reflectors that cover side faces and a top face of the scintillator when a face of the scintillator to which the light detector is optically connected is a bottom face, wherein
all faces of the scintillation counter crystals constituting the side faces of the scintillator are smooth surfaces.

10. The radiation detector according to claim 1, further comprising:
scintillator reflectors that cover side faces and a top face of the scintillator when a face to which the light detector is optically connected is a bottom face of the scintillator, wherein
only faces of scintillation counter crystals that form the side faces of the scintillator are smooth surfaces.

11. The radiation detector according to claim 1, wherein the faces of the scintillation counter crystals remain unprocessed in a condition in which a crystal ingot is hewn out.

\* \* \* \* \*